May 1, 1962   C. B. McGREW, JR   3,032,644
LAMP ASSEMBLY FOR MOTOR VEHICLES
Filed June 6, 1960
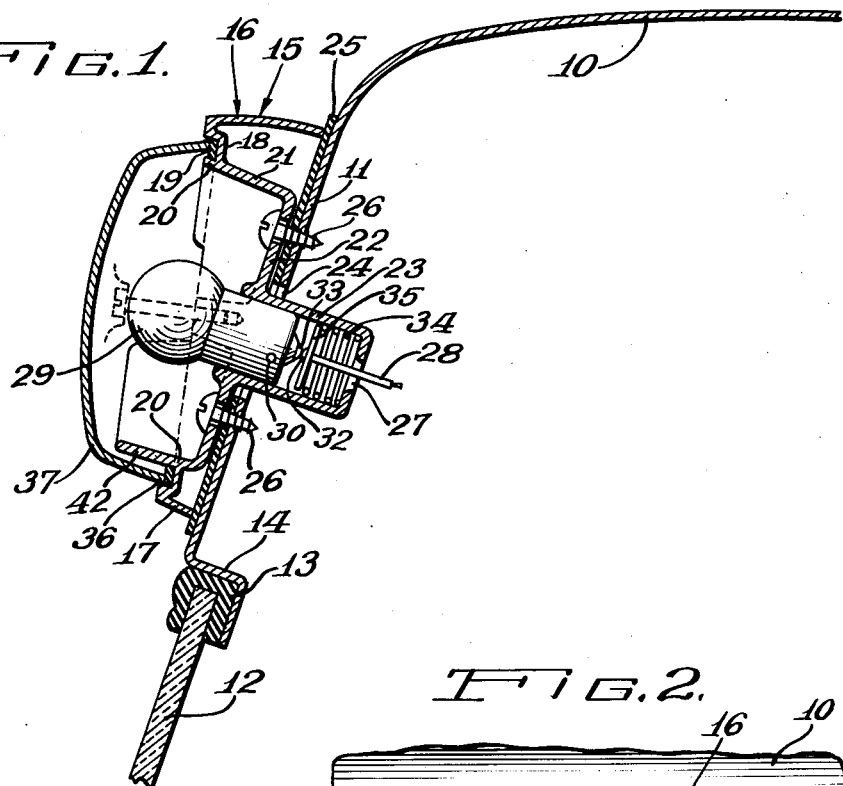
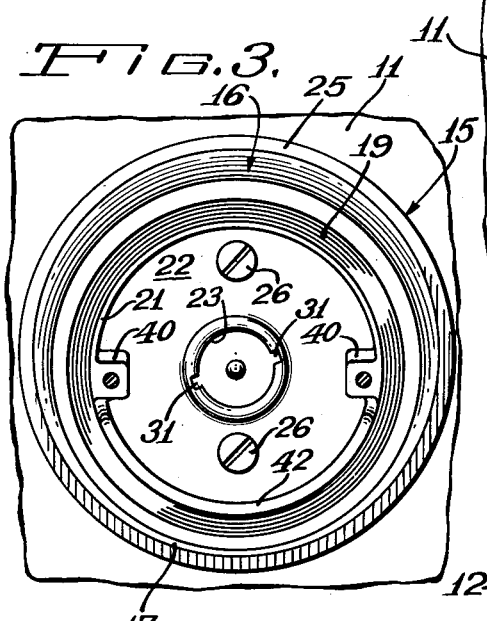
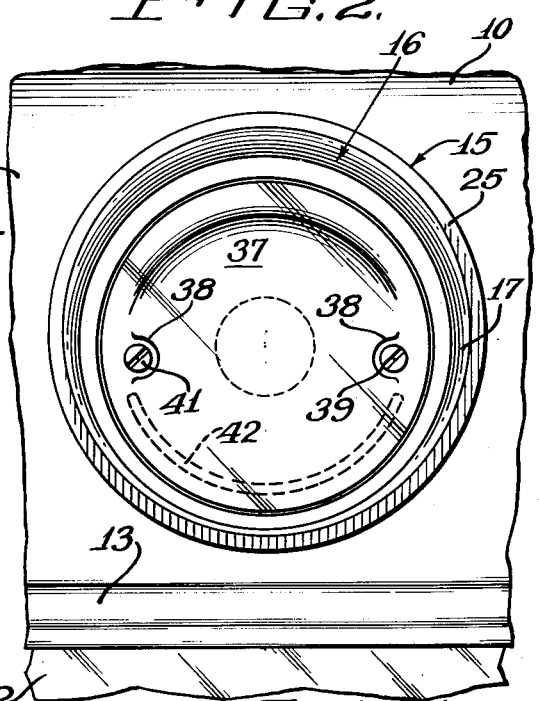
Inventor:
Charles B. McGrew, Jr.
Paul O. Pierret
Atty.

3,032,644
LAMP ASSEMBLY FOR MOTOR VEHICLES

Charles B. McGrew, Jr., Fort Wayne, Ind., assignor to International Harvester Company, Chicago, Ill., a corporation of New Jersey
Filed June 6, 1960, Ser. No. 33,973
12 Claims. (Cl. 240—7.1)

This invention relates to lamp assemblies for motor vehicles and more particularly to a new and improved marker, clearance, or identification lamp assembly for motor trucks having a light ray shield incorporated therein.

The laws of certain states and Federal Interstate Commerce Commission regulations pertaining to safety on the highways require motor trucks to be equipped with marker or identification lamps for visually indicating the relative size of the vehicle. The marker lamps must be conspicuously located and are generally mounted on the forwardly facing windshield header or forwardmost portion of the roof panel of the operator's compartment. The windshields of most present-day motor trucks generally slope downwardly and forwardly from the windshield header and since the marker lights are usually located adjacent the upper marginal edge of the windshield, the downwardly and forwardly directed rays of light being emitted by the marker lamps oftentimes depending on certain other factors such as atmospheric conditions and the degree of cleanliness of the windshield produce undesirable optical illusions or phantom images on the windshield to impair the vehicle operator's visibility and driving comfort. It is, therefore, one of the primary objectives of the present invention to provide a marker lamp assembly having a built-in light ray shield oriented in such a fashion with respect with the lamp bulb that the light rays being emitted therefrom normally directed toward the windshield are blocked.

A further object is the provision of a light ray shield for a marker lamp assembly which is relatively inexpensive to incorporate into the lamp housing structure.

A still further object is the provision of a marker lamp assembly having an arcuate light ray shield integrally formed with the socket and lens supporting base member which is effective to prevent undesirable glare on the windshield when the marker lamp is being used but which will not minimize the effectiveness of the lamp as a motor vehicle marker or identification light.

The foregoing and other important objects and desirable features inherent in and encompassed by the invention together with many of the purposes and uses thereof, will become readily apparent from a reading of the ensuing description in conjunction with the annexed drawings, in which:

FIGURE 1 is a vertical sectional view of a marker lamp assembly embodying the invention;

FIGURE 2 is a front elevational view of the marker lamp assembly shown in FIGURE 1; and FIGURE 3 is a view similar to FIGURE 2 with the exception that the lens is removed.

Referring to the drawings in detail, wherein like reference characters represent like elements throughout the various views, the roof 10 of a motor vehicle truck cab or operator's compartment is partially shown. The forwardmost part 11 of the roof panel 10 slopes downwardly and forwardly from the general plane of the roof panel 10 as in conventional motor truck cab constructions and such inclined forwardmost part of the roof panel is usually designated as a windshield header 11 inasmuch as it extends transversely above the vehicle windshield 12, partially shown in FIGURE 1. The peripheral marginal edge of the windshield 12 is seated within a rubber-like sealing strip 13, a portion of which is carried by the lowermost edge 14 of the windshield header 11. The windshield 12 is generally inclined downwardly and forwardly from the lowermost edge 14 of the windshield header 11, as illustrated in FIGURE 1.

As stated hereinbefore the marker lamps must be located in such positions that they are readily visible and, hence, are generally mounted on the windshield header 11 of the vehicle cab directly above the windshield 12.

Consequently a portion of the light rays which diverge radially from the light source strike the windshield 12 and oftentimes depending somewhat on atmospheric conditions and the cleanliness of the windshield 12, phantom images or optical illusions are created which are annoying to the vehicle operator and adversely affect his visibility. Prior to the present invention no means were contemplated for overcoming this phenomenon and its resulting adverse effect on the vehicle operator.

The lamp housing 15 of the present invention includes a lens-supporting base member 16 which is generally circular, as seen in FIGURE 3. The lens-supporting base member 16 is formed to provide a generally annular outer wall 17 which has a plating of chrome or the like on the outer surface thereof to improve the appearance of the lamp housing 15. One end of the generally annular outer wall 17 of the lens-supporting base member 16 is integrally formed with a radially inwardly spaced annular flange 18 having a substantially L-shape in vertical section, as illustrated in FIGURE 1. The L-shaped flange 18 serves as a supporting ledge for receiving a ring-like gasket 19. In order to maintain the gasket 19 on the ledge, upper and lower arcuate ridges 20, integrally formed with the flange 18 are provided. Integrally formed with the radially innermost peripheral edge of the L-shaped flange 18 and being substantially an axial continuation of the ridges 18 is an axially, inwardly extending generally annular inner wall 21 which is radially spaced inwardly from the outer wall 17. The innermost axial end of the generally annular inner wall 21 is closed by a circular mounting plate 22 integrally formed therewith. Projecting axially inwardly from the mounting plate 22 is a centrally located, integrally formed lamp bulb socket element 23. The cylindrical socket element 23 has one end opening into the mounting plate 22 and its opposite end closed.

As shown in FIGURE 1 the windshield header 11 is provided with an opening 24 therethrough and when the marker lamp housing 15 is mounted on the windshield header 11 the cylindrical socket element 23 is adapted to extend therethrough. Sealing means in the form of a gasket 25 is interposed between the header 11 and the marker lamp housing 15. A pair of sheet metal screws 26 are utilized to fasten the marker lamp housing 15 to the windshield header 11. When the sheet metal screws 26 are drawn up tightly the innermost peripheral edge of the outer wall 16 is forced tightly into abutting engagement with the gasket 25 and as a result a water-tight seal is obtained.

The closed end of the socket element 23 is provided with an aperture 27 through which an electrically insulated conductor 28 partially shown extends. A lamp bulb 29 which is of conventional construction has a pair of diametrically oppositely extending projections 30 (only one of which is shown in FIGURE 1) which are cooperable with a pair of bayonet-type slots 31 formed in the socket element 23 to maintain the bulb 29 mounted in the socket element 23. The terminal end 32 of the conductor 28 is yieldably urged into abutting engagement with the contact 33 of the bulb 29 by means of a helically-wound compression spring 34 disposed within the socket element 23 and reacting against the closed end thereof and a circular disk 35 fixed to the conductor 28. The structure described above for supporting the lamp bulb 29 on the lamp housing structure 15 and the means for supplying the same with electric current is conventional and forms no part of the present invention.

The peripheral edge portion 36 of a translucent cup-shaped lens 37 is adapted to be seated on the gasket 19. The curved face of the lens 37, which lens is made of glass, plastic material or the like is formed with a pair of laterally spaced depressions 38 the bottoms of which are defined by flat surfaces 39 which lie substantially in a plane spaced from and parallel to the plane of the gasket 19 when mounted within on the L-shaped flange 18. The lens 37 is positionable on the gasket 19 wherein each flat surface 38 is in alignment with a projection 40 integrally formed with the mounting plate 22 and inner wall 21 and projecting radially inwardly from the inner wall 21 of the lamp housing 15. The projections 40 are circumferentially spaced between adjacent ends of the ridges 20. Each projection 40 is provided with a threaded aperture for threadingly receiving the threaded end of a screw 41 extending through an opening formed through a respective depression flat surface 39. When the screws 41 are drawn up tightly the heads of the screws 41 engage the flat depression bottom surfaces 39 and the peripheral edge 36 of the lens 37 is firmly pressed into sealing engagement with the gasket 19.

Referring to FIGURE 1 it will be noted that the lamp bulb 29 projects forwardly of a vertical plane containing the upper marginal edge of the windshield 12 as in conventional marker lamp installations and inasmuch as the light rays emitted by the lamp bulb diverge radially therefrom the downwardly directed light rays would strike the windshield 12 to possibly create undesirable optical illusions or phantom images on the windshield. In order to eliminate this possibility a light ray shield, designated generally by numeral 42, is provided.

The light ray shield 42 is arcuate in shape and is in effect an axial extension or continuation of the lowermost arcuate ridge 20 integrally formed with the L-shaped flange 18. The light ray shield extends arcuately approximately 142° between the projections 40, as best illustrated in FIGURE 3, and projects axially into the space enclosed by the lens 37. It will be noted that the forwardmost edge of the light ray shield 42 is spaced forwardly of the lamp bulb 29 and hence it will be appreciated that the radially and downwardly rays of light emitted by the lamp bulb 29 are blocked by the light ray shield 42 and are prevented from striking the windshield 12 where they could possibly produce undesirable optical illusions or phantom images to impair the vehicle operator's visibility and driving comfort.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

I claim:

1. A motor vehicle marker light assembly comprising a base member and a cup-shaped lens, said base member including generally annular, radially spaced and aligned, axially extending outer and inner walls, one of said walls having an axial end adjacent to and connected to a respective axial end of the other wall, the peripheral rim of said lens being supported on the connected axial ends of said walls, and a light ray shield integrally formed with and extending axially from the connected axial ends of said walls into the space enclosed by said lens.

2. A motor vehicle marker lamp assembly comprising a base member and cup-shaped lens, said base member including generally annular, radially spaced and aligned, axially extending outer and inner walls, one of said walls having an axial end adjacent to and connected to a respective axial end of the other wall, the peripheral rim of said lens being supported on the connected axial ends of said walls, and an arcuate light ray shield integrally formed with and extending axially from the connected axial ends of said walls into the space enclosed by said lens, said light ray shield having substantially the same radius of curvature as said inner wall and extending arcuately at least 142°.

3. A motor vehicle marker lamp assembly comprising a base member and a cup-shaped lens, said base member including generally annular, radially spaced and aligned, axially extending outer and inner walls, an annular flange having a substantially L-shaped cross section connecting an axial end of one of said walls to a respective axial end of the other wall adjacent thereto, one leg of said flange lying in a radially extending plane, the peripheral rim of said lens being supported on said one leg of said flange, and a light ray shield integrally formed with and extending axially from said one leg of said flange into the space enclosed by said lens.

4. A motor vehicle marker lamp assembly substantially as set forth in claim 3, wherein said inner and outer walls, annular flange and light ray shield are integrally formed.

5. A motor vehicle marker lamp assembly comprising a base member and a cup-shaped lens, said base member including generally annular, radially spaced and aligned, axially extending outer and inner walls, an annular flange having a substantially L-shaped cross section connecting an axial end of one wall to a respective axial end of the other wall adjacent thereto, one leg of said flange lying in a radially extending plane, the peripheral rim of said lens being supported on said one leg of said flange, and an arcuate light ray shield integrally formed with and extending axially from an inner peripheral edge portion of said one leg of said flange, said light ray shield having substantially the same radius of curvature as said inner wall and extending arcuately over 100°.

6. A motor vehicle marker lamp assembly substantially as set forth in claim 5, wherein said inner and outer walls, annular flange and light ray shield are integrally formed.

7. A motor vehicle marker lamp assembly adapted to be mounted on the windshield header of a motor truck cab above the upper marginal edge of the windshield, the combination including said windshield header and windshield comprising a base member and a cup-shaped lens, said base member including generally annular, radially spaced and aligned, axially extending outer and inner walls, means for connecting an end of one wall to a respective end of the other wall adjacent thereto including an annular flange having a substantially L-shaped cross section, the peripheral rim of said lens being supported on one leg of said flange, a mounting plate attached to the end of said inner wall opposite the end connected to said flange, said mounting plate being secured to the windshield header and carrying longitudinally extending lamp bulb socket means centrally thereof, and a light ray shield integrally formed with and extending longitudinally axially from a portion of one leg of said flange, said light ray shield being spaced between the longitudinal axis of said lamp bulb socket means and the upper marginal edge of the windshield.

8. A motor vehicle marker lamp assembly adapted to be mounted on the windshield header of a motor truck cab above the upper marginal edge of the windshield, the combination including said windshield header and windshield comprising a base member and a cup-shaped lens, said base member including generally annular, radially spaced and aligned, axially extending outer and inner walls, means for connecting a longitudinal axial end of one wall to a respective longitudinal axial end of the other wall adjacent thereto including an annular flange having a substantially L-shaped cross section, one leg of said flange lying in a radially extending plane, the peripheral rim of said lens being supported on said one leg of said flange, a circular mounting plate closing the axial end of said inner wall opposite the end connected to said flange, said mounting plate being secured to the windshield header and carrying longitudinally extending lamp bulb socket means centrally thereof, and an arcuate light ray shield integrally formed with and extending axially from an inner peripheral edge portion of said one leg of said flange, said light ray shield having substantially the same radius of curvature as said inner wall and extending arcuately over 100°, said light ray shield being spaced between the longitudinal axis of said lamp bulb socket means and the upper marginal edge of the windshield.

9. A motor vehicle marker lamp assembly substantially as set forth in claim 8, wherein said inner and outer walls, annular flange, mounting plate and light ray shield are integrally formed.

10. A motor vehicle marker lamp assembly adapted to be mounted on the windshield header of a motor truck cab above the upper marginal edge of the windshield, the combination including said windshield header and windshield comprising a base member secured to said windshield header and a cup-shaped lens, said base member including an outer wall and an inner wall radially spaced from and aligned with the outer wall, said walls extending axially and having respective adjacent axial ends connected together, the peripheral rim of said lens being supported on the connected ends of said walls, said walls carrying a longitudinally extending lamp bulb socket means, and a light ray shield integrally formed with said walls, said light ray shield being spaced between the longitudinal axis of said lamp bulb socket means and the upper marginal edge of the windshield.

11. A motor vehicle marker lamp assembly adapted to be mounted on the windshield header of a motor truck cab above the upper marginal edge of the windshield, the combination including said windshield header and windshield comprising a base member and a cup-shaped lens, said base member including generally annular, radially spaced and aligned, axially extending outer and inner walls, means for connecting a longitudinal axial end of one wall to a respective longitudinal axial end of the other wall adjacent thereto including an annular flange having a substantially L-shaped cross section, one leg of said flange lying in a radially extending plane, the peripheral rim of said lens being supported on said one leg of said flange, a circular mounting plate closing the longitudinal axial end of said inner wall opposite the end connected to said flange, said mounting plate being secured to the windshield header, said mounting plate carrying a longitudinally extending lamp bulb socket means centrally thereof, and a light ray shield integrally formed with and extending longitudinally axially from a portion of said one leg of said flange, said light ray shield being vertically spaced between the longitudinal axis of said lamp bulb socket means and the upper marginal edge of the windshield.

12. A motor vehicle marker lamp assembly adapted to be mounted on the windshield header of a motor truck cab above the upper marginal edge of the windshield, the combination including said windshield header and windshield comprising a base member and a cup-shaped lens, said base member including generally annular, radially spaced and aligned, axially extending outer and inner walls, means for connecting a longitudinal axial end of one wall to a respective longitudinal axial end of the other wall adjacent thereto including an annular flange having a substantially L-shaped cross section, one annular leg of said flange lying in a radially extending plane, the peripheral rim of said lens being supported on said one leg of said flange, a circular mounting plate closing the axial end of the said inner wall opposite the end thereof connected to said flange, said mounting plate being secured to the windshield header, said mounting plate carrying a longitudinally extending lamp bulb socket means centrally thereof, and an arcuately shaped light ray shield integrally formed with and extending axially from a portion of said one leg of said flange, said light ray shield being an axial continuation of a portion of said inner wall and extending arcuately approximately 142°, said light ray shield being spaced between the longitudinal axis of said lamp bulb socket means and the upper marginal edge of the windshield.

References Cited in the file of this patent

UNITED STATES PATENTS

| | | |
|---|---|---|
| 1,324,625 | Shaw | Dec. 9, 1919 |
| 1,889,623 | Arbuckle | Nov. 29, 1932 |
| 2,157,361 | Urge | May 9, 1939 |
| 2,855,498 | Knapp | Oct. 7, 1958 |
| 2,876,340 | Williams | Mar. 3, 1959 |
| 2,916,607 | Bargman | Dec. 8, 1959 |